Aug. 31, 1937.                    L. L. SMALLEY                    2,091,656
                           MOTOR VEHICLE TESTING APPARATUS
                              Filed May 7, 1934         7 Sheets-Sheet 1
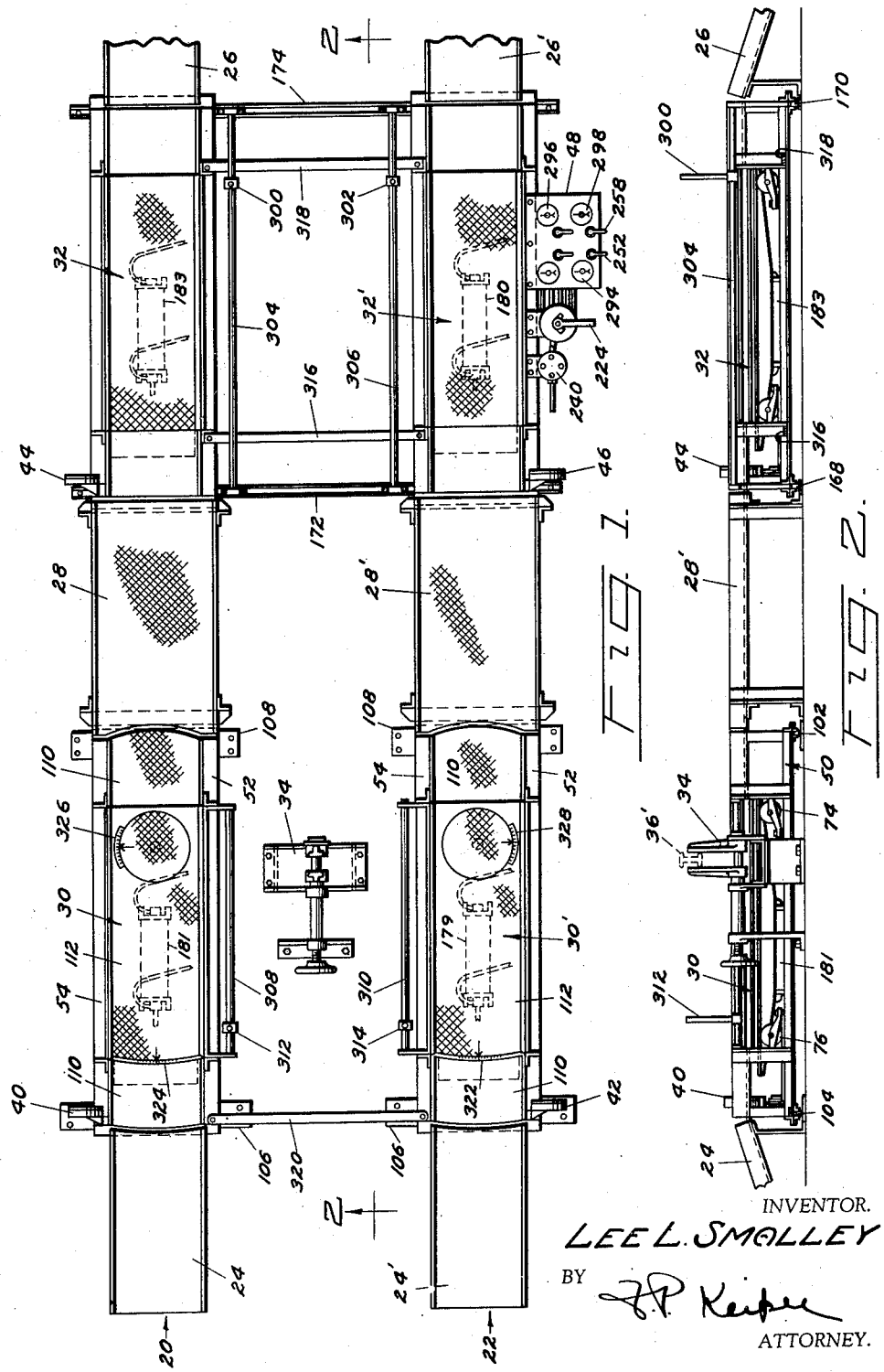
INVENTOR.
LEE L. SMALLEY
BY
J. P. Keiper
ATTORNEY.

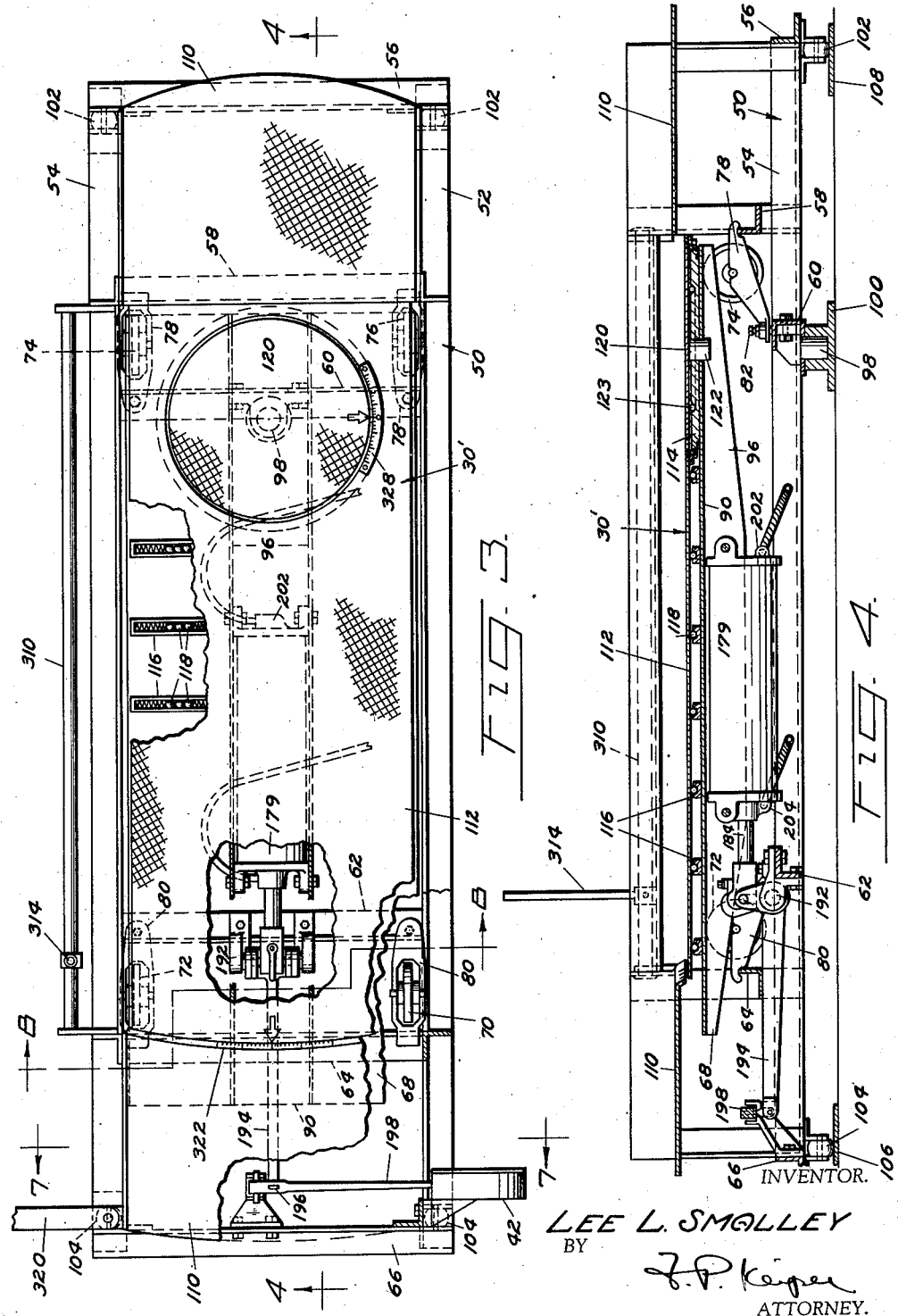

Aug. 31, 1937.    L. L. SMALLEY    2,091,656
MOTOR VEHICLE TESTING APPARATUS
Filed May 7, 1934    7 Sheets-Sheet 3
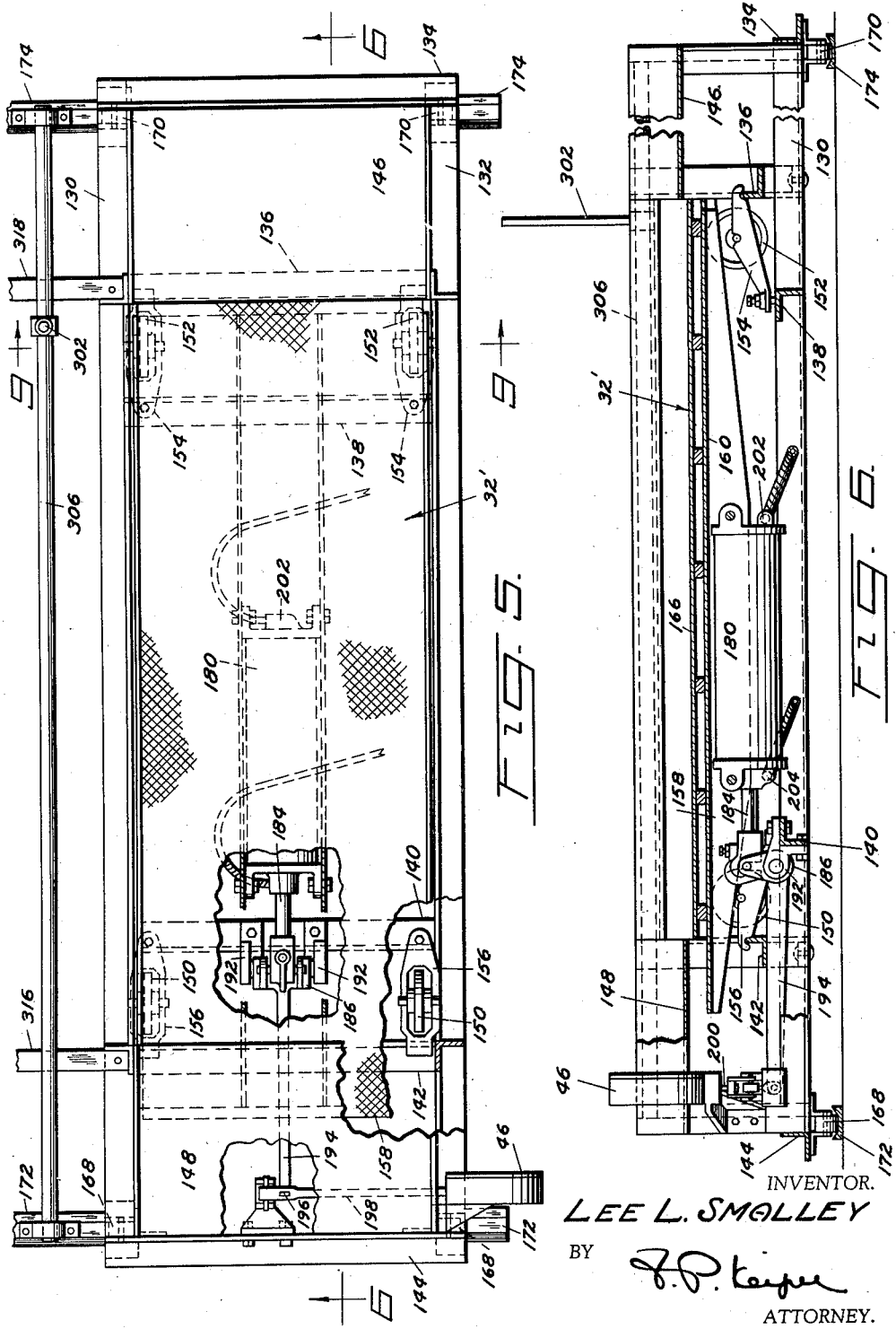
INVENTOR.
LEE L. SMALLEY
BY
ATTORNEY.

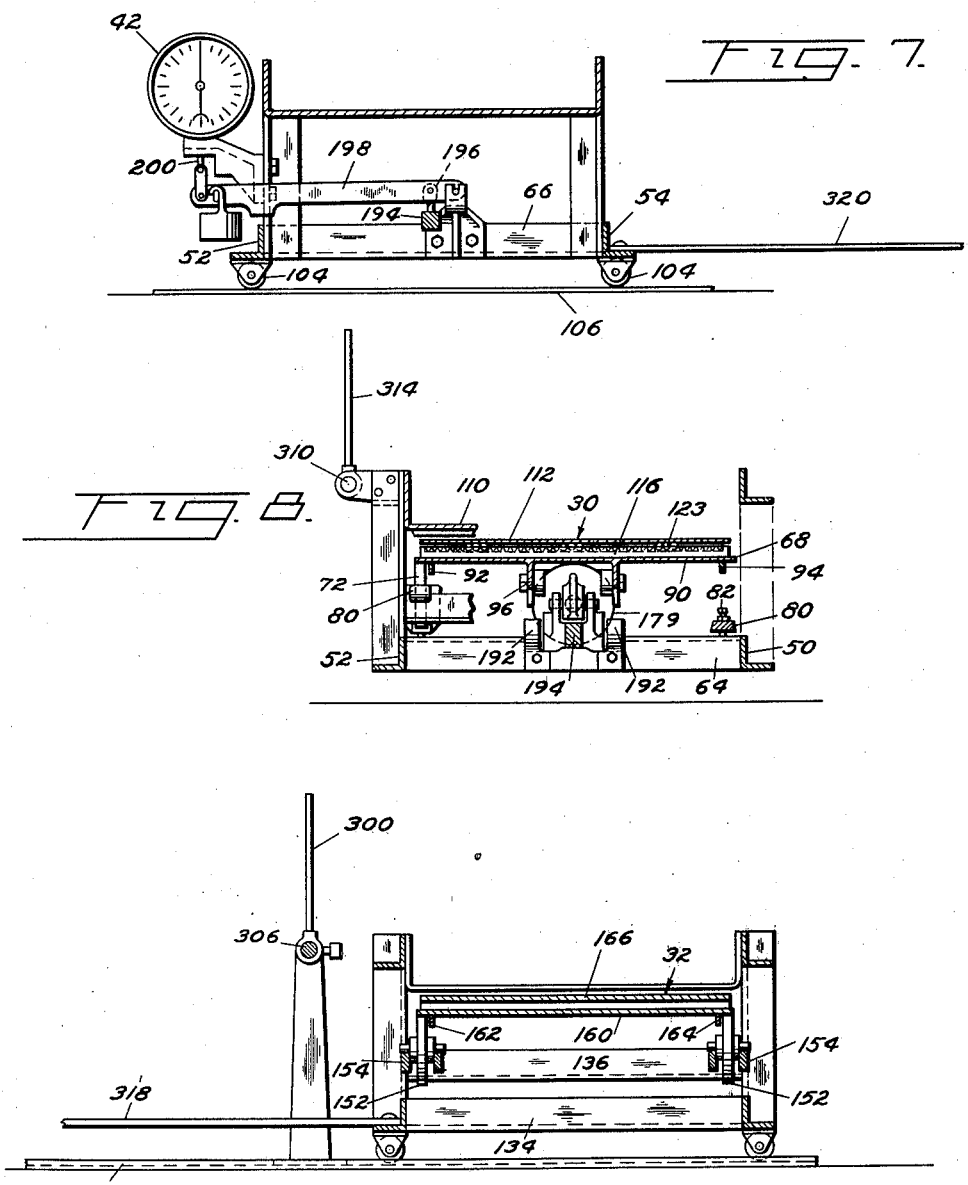

Aug. 31, 1937.　　　L. L. SMALLEY　　　2,091,656
MOTOR VEHICLE TESTING APPARATUS
Filed May 7, 1934　　　7 Sheets-Sheet 5

INVENTOR.
LEE L. SMALLEY
BY F. P. Keiper
ATTORNEY.

INVENTOR.
LEE L. SMALLEY
BY
ATTORNEY.

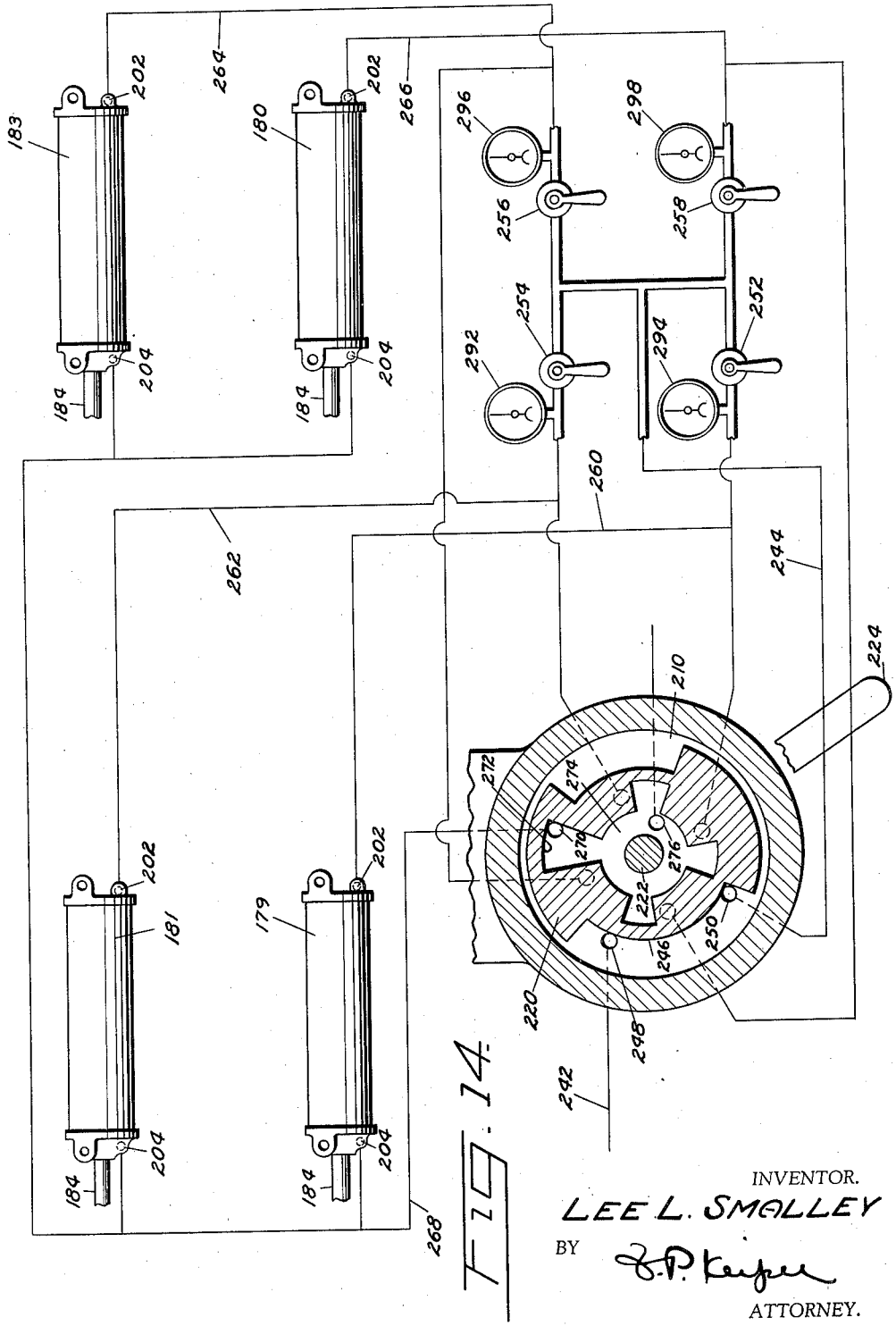

Patented Aug. 31, 1937

2,091,656

UNITED STATES PATENT OFFICE 2,091,656

MOTOR VEHICLE TESTING APPARATUS

Lee L. Smalley, South Bend, Ind., assignor to Bendix Aviation Corporation, South Bend, Ind., a corporation of Delaware Application May 7, 1934, Serial No. 724,445

22 Claims. (Cl. 73—51)

This invention relates to motor vehicle testing apparatus and more particularly to apparatus for testing the running gear thereof such as brakes and wheels and their alignment.

Heretofore the testing of brakes and the testing of wheel alignment and associated inspections and adjustments have often been considered as separate operations and as such requiring separate measuring apparatus, and therefore, this invention is directed to a novel consolidation of apparatus adapted to be employed for various testing purposes to the end that numerous elements thereof may have dual functions and mutually aid one another in performing various tests, that a compact machine requiring a minimum of floor space may be provided capable of performing all the functions of many separate machines and that such operations may be performed without necessitating the removal of the vehicle from one machine to another or without moving the vehicle appreciably on the machine.

An object of the invention, therefore, is to provide in a machine of the brake testing type, mechanism whereby wheel aligning tests may be made without materially changing the shape or size of the machine and which mechanism, although consolidated with the brake testing apparatus not only fails to interfere with the various functions thereof, but which mechanism mutually aids and facilitates the various operations of the brake testing machine.

Another object of the invention is to provide a brake testing apparatus capable of producing accurate measurements of brake effectiveness of the brakes mounted on dirigible wheels, particularly when said wheels are turned to the right or left and away from straight ahead.

A further object of the invention is to provide pivotal support means for the dirigible wheels of a vehicle which may be used to measure caster and camber and king-pin inclination, which means may also be useful in supporting the wheels while turning the brake testing apparatus to any desired angle for a test, it being understood that the vehicle wheels may thereafter be steered to the angle at which the apparatus is set, it being unnecessary to steer the wheels and rotate the brake testing apparatus simultaneously.

Yet another object of the invention is to provide in a brake testing device having reciprocating treads, means whereby the treads may shift laterally to reduce side thrusts thereon and also to aid in checking the alignment of the wheels.

Still another object of the invention is to provide an improved mechanism for measuring a force necessary to longitudinally move a wheel tread against the resistance of a wheel.

A still further object of the invention is to provide on a brake testing apparatus having wheel runways, means whereby wheel engaging sections of the runways may be moved laterally or pivotally to aid in testing brakes, and facilitate the making of other kindred measurements such as frame and wheel alignment.

Yet a further object of the invention is to provide an improved control valve and system for distributing fluid pressure to various motors for testing brakes.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 1 is a top plan view of the testing machine;

Fig. 2 is a side elevation of one of the runways as viewed from the section line 2—2 of Fig. 1;

Fig. 3 is an enlarged top plan view partly broken away of a portion of the runway illustrating a front wheel support platform;

Fig. 4 is a vertical longitudinal section of the support platform of Fig. 3, and taken on the line 4—4;

Fig. 5 is an enlarged top plan view partly broken away of a portion of the runway illustrating a rear wheel support platform;

Fig. 6 is a vertical longitudinal section of the support platform of Fig. 5, and taken on the line 6—6;

Fig. 7 is a transverse section of the platform of Fig. 3, taken on the line 7—7;

Fig. 8 is a transverse section of the platform of Fig. 3, taken on the line 8—8;

Fig. 9 is a transverse section of the platform of Fig. 5, taken on the line 9—9;

Fig. 14 is a diagrammatic layout of the fluid pressure lines and valves employed to operate the cylinders and pistons of the various platforms and illustrates the main control valve of Fig. 13 in forward position;

Figure 10:
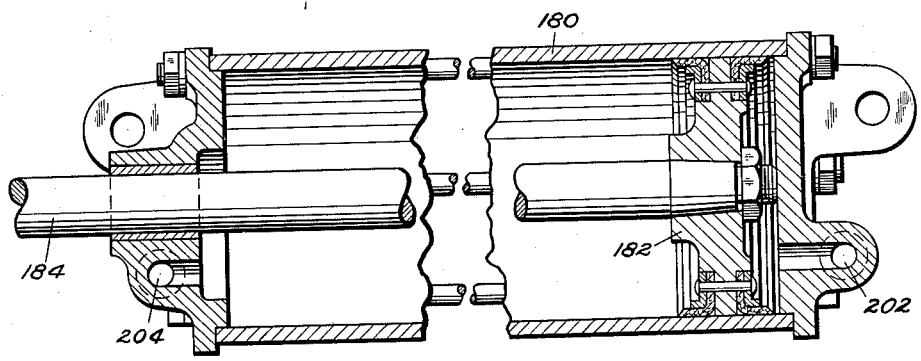
Fig. 10 is a detailed section through an actuating cylinder and piston such as shown in Figs. 4 and 6.

Referring to Figs. 1 and 2 particularly, there is shown a pair of runways 20 and 22 which are spaced apart the usual tread width of the standard motor vehicle. Each of these runways is provided with a stationary ramp 24, 24' and 26, 26' at either end and a center stationary section 28, 28'. Intermediate each ramp and the center portion are interposed movable platforms each of which is adapted to support a wheel of the motor vehicle to be tested. The platforms 30, 30' are particularly adapted to support the front wheel of the vehicle and platforms 32, 32' are particularly adapted to support the rear wheels of the vehicle and in order to prevent backward and forward movement of the vehicle while on the testing machine, a clamping device 34 adapted to engage the front axle 36' of the vehicle, as shown in Fig. 2, may be provided. Conveniently located on each of the platforms are gauges 40, 42, 44 and 46 and at the rear and at one side of the machine are located a plurality of control valves and gauges 48, the function of which will be described more fully hereinafter.

Referring to Figs. 3 and 4 wherein the front wheel support platforms are illustrated in more detail, it will be observed that the wheel platform comprises a support frame 50 comprising longitudinal channel members 52 and 54 and cross braces 56, 58, 60, 62, 64 and 66. In order to support a longitudinally movable carriage 68 within the framework 50 there are provided four rollers 70, 72, 74 and 76, carried on adjustable levers 78 and 80, which carry the rollers in the center thereof and which rest at their ends upon the cross members 58, 60 and 62, 64 respectively. In order to adjust these rollers to a uniform height, adjusting screws such as 82 may be provided in one end of the levers so that one end may be raised or lowered. The carriage 68, referring to Fig. 8, comprises a flat plate 90 having flanges 92 and 94 thereunder in order to guide the same on the rollers 70, 72, 74 and 76, and longitudinally arranged channelling 96 on the under side in order to strengthen the plate 90 against the load of a vehicle wheel supported thereon.

Referring again to Fig. 4 it will be observed that the front wheel support frame is mounted for horizontal pivotal movement, the frame being provided with a pivot 98 cooperating with a fixed socket 100, and at either end of the frame are rollers 102 and 104 which are adapted to roll on transverse or arcuate tracks 106 and 108. The support frame is also provided with short fixed runway portions 110 at either end and under which the carriage 68 is adapted to reciprocate. The carriage is provided with a tread 112 pivoted at one end to a trunnion 114, secured to the plate 90. To permit the tread 112 to move laterally with minimum friction, a series of transverse troughs 116 are provided which contain anti-friction balls 118 adapted to freely roll in engagement with the under side of the tread 112. Adjacent the pivoted end of the tread 112 is located a circular tread plate or turntable 120 which is likewise pivoted to the plate 90 by means of stub shaft 122 secured to the turntable. Suitable anti-friction balls 123 arranged in arcuate paths beneath the plate may also be provided to permit the plate to rotate freely when loaded. This plate is preferably located on the carriage at a point which may, by reciprocation of the carriage, be brought into alignment with the pivot about which the support frame is swingable so that by resting the wheel of a vehicle on the pivot plate the support frame may be rotated freely to any angular position without necessarily turning the vehicle wheel at the same time or slipping the wheel relative to the tread.

Referring to Fig. 5 wherein is illustrated a rear wheel platform 32', there is shown a support frame similar to that of the forward platform comprising longitudinal channels 130 and 132 and transverse members 134, 136, 138, 140, 142 and 144. The support frame likewise at either end is provided with short runway sections 146 and 148. Rollers 150 and 152 carried on levers 154 and 156 which are adjustably supported on the cross members 136, 138 and 140, 142 respectively are adapted to carry the reciprocable carriage 158, which carriage comprises a plate 160, provided with flanges 162 and 164 to guide the same on the rollers and a vehicle tread 166, the foregoing being quite similar to the front wheel support.

The platform for supporting the rear wheel, however, differs from the platform preferably employed for supporting the front wheel of the vehicle, in that it is mounted for transverse movement relative to the runway instead of pivotal movement. For this purpose at either end of the support frame there are provided rollers 168 and 170 which are adapted to travel on transverse tracks 172 and 174 respectively.

Figure 11:
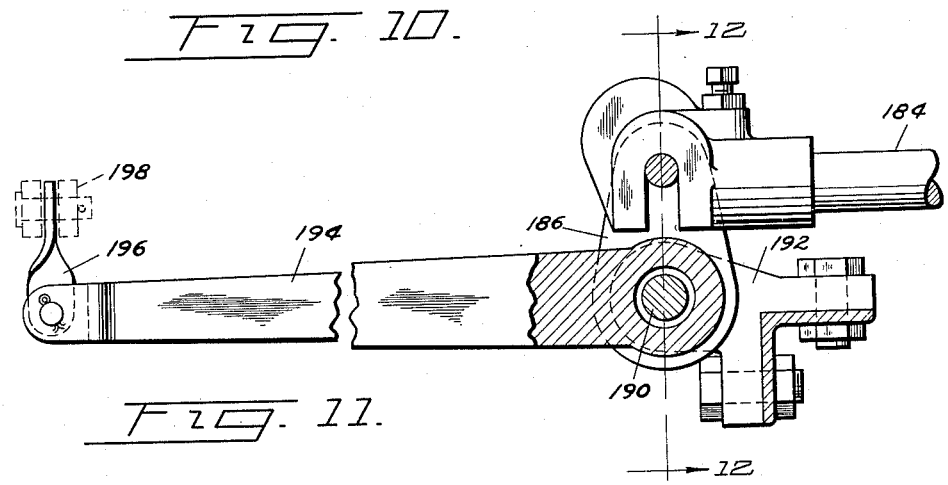
Fig. 11 is a detailed side elevation of a portion of the linkage employed in measuring the piston force applied by the cylinder and piston of Fig. 10.
Figure 12:
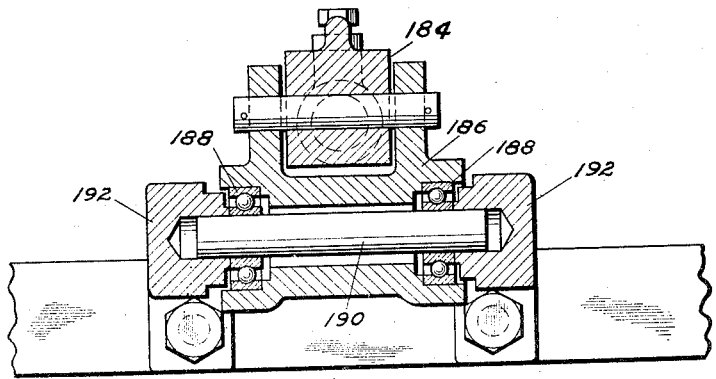
Fig. 12 is a transverse section through the fulcrum of Fig. 11, taken on the line 12—12 of Fig. 11.

In order to employ the apparatus so far described for testing brakes, it is necessary to reciprocate the various wheel treads with the wheels of the vehicle supported thereon so as to turn the vehicle wheels against the resistance of their brakes and to measure the force necessary to perform the operation. For this purpose each of the movable carriages of the various platforms is provided with a cylinder 180 which is rigidly secured to the under side of the movable carriage. Referring to Fig. 10, a piston 182 is reciprocably mounted within the cylinder and is adapted to actuate a piston rod 184 that is connected to a lever 186, best illustrated in Fig. 11. The lever 186 is pivotally supported on anti-friction bearings 188 and a short shaft 190 carried in trunnions 192 fixed to the end cross brace such as 62 or 140 of the forward or rearward support frames or platforms respectively. Movement of the levers 186 is resisted by the extended lever arm 194 which is connected by a link 196 to a second lever 198 transversely arranged and pivoted at one end to a cross member 66 or 144 in the front or rear platforms respectively. The other end of the lever 198 is connected to adjacent gauges such as 40, 42, 44 and 46, which gauges are adapted to indicate the tension applied thereto through the tension link 200.

Figure 13:
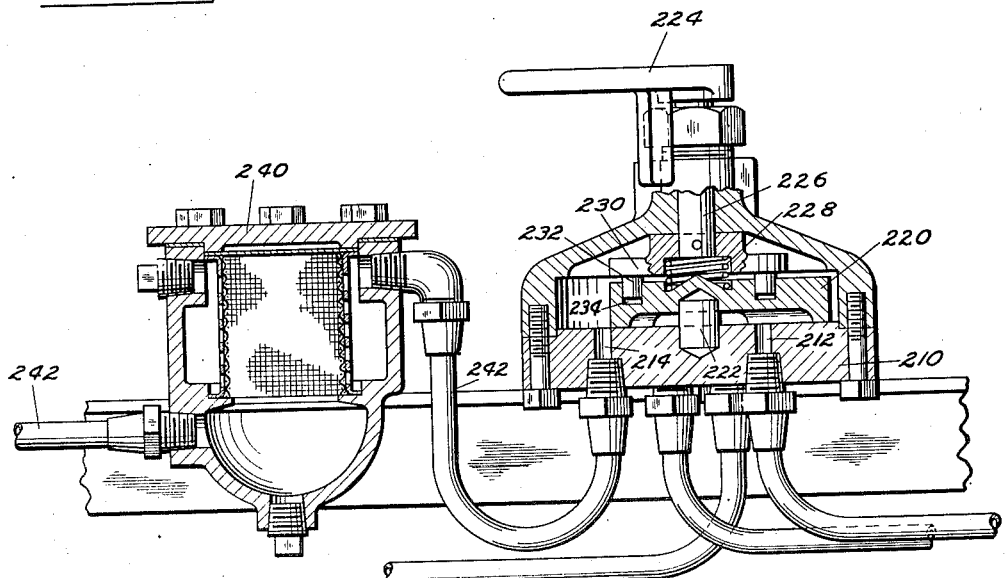
Fig. 13 is a detailed section through the main control valve shown in the lower right hand corner of Fig. 1.

For the purpose of reciprocating the cylinders and carriages secured thereto, fluid pressure may be applied to either end of the cylinder through ports 202 and 204, which ports are connected up in a system diagrammatically shown in Fig. 14. To control the overall operation of the cylinders, a valve such as shown in Fig. 13 may be provided, which valve comprises a valve seat 210 into which are connected through ports such as 212 and 214 a plurality of pipe lines. Adapted for rotation on the valve seat, is a grooved valve plate 220 which is arranged to turn about the pin 222 by means of the handle 224 and shaft 226. To hold the grooved valve plate tight against the valve seat 210, a spring 228 is preferably interposed between the shaft 226 and the valve, and the connection between the shaft 226 and the valve plate is such as to permit a certain amount of axial movement, this connection being constituted by the collar 230 carrying pins 232 engaging sockets 234 in the top of the valve plate 220. A suitable filter 240 may be connected in the compressed air supply line 242 in order to prevent impurities and dirt from entering the mechanism.

Figures 15, 16:
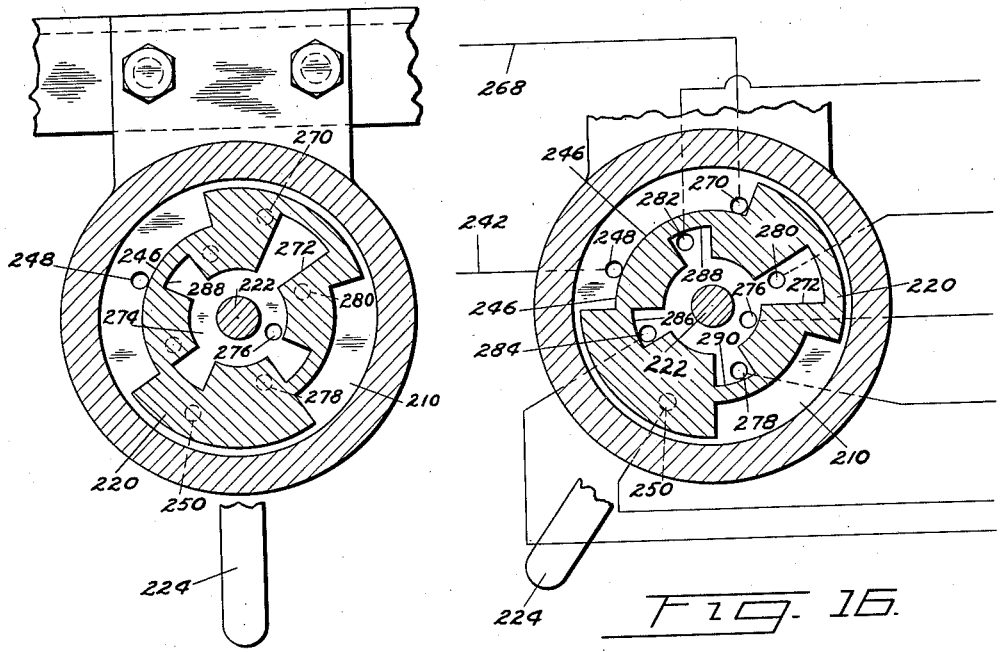
Fig. 15 illustrates the position of the valve of Fig. 13 when in closed position.
Fig. 16 illustrates the position of the valve of Fig. 13 when in reverse position.

The valve plate 220 is shaped as shown in Figs. 14, 15 and 16, and the pipe lines or ports such as 212 and 214 enter through the valve seat also as illustrated in these figures. Referring to Fig. 14, the valve is positioned in what is known as the "forward" position and it will be observed that the inlet pipe diagrammatically illustrated by a line 242 is connected to the pipe line 244 by means of the sector-shaped cutaway portion 246 of the valve disc 220, which cutaway portion embraces the ports 248 and 250 in the valve seat, when the plate is turned to this position.

Compressed air from the line 244 is distributed to the individual control valves 252, 254, 256 and 258 from whence run connections 260, 262, 264 and 266 to the right hand end of the power cylinders 179, 181, 183 and 180 respectively. The left hand ends of all the power cylinders are connected together to a common pipe 268 which is adapted to connect to a port 270 in the master valve and which port in the position shown in Fig. 14 registers with the sector-shaped cutaway portion 272 in the valve disc 220. This sector-shaped cavity connects to a central circular cavity 274, which, at all times, registers with a port 276 in the valve seat connected to atmosphere or exhaust. Referring to Fig. 15 it will be observed that the master valve is in the "off" position and that the port 248 which is connected to the fluid pressure supply line 242 is not connected to any other port, the sector-shaped cutaway portions 246 of the valve disc having been rotated through about forty-five degrees, and it will also be noted that the exhaust port 276 is likewise disconnected from all other ports. Referring to Fig. 16, wherein the master valve is turned to the "return" position, it will be observed that the port 248, which is connected to the fluid pressure supply line 242, is now connected to the common pipe connecting the left ends of each of the power cylinders since the segmental cutaway portion 246 has been rotated to connect the two ports 248 and 270. Also referring to Fig. 14, it will be observed that the right hand end of each cylinder is connected to an individual port such as 278, 280, 282, 284, which ports in the valve position shown in Fig. 16, are adapted to line up with a plurality of small segmental recesses 286, 288, 290 and the recess 272 all communicating with the circular central cavity 274, to the end that the right end of each of the cylinders is connected to the atmosphere or exhaust port 276. Suitable gauges 292, 294, 296 and 298 are supplied to indicate the pressure supplied to each cylinder during its forward stroke.

In order to test the alignment of the frame of a vehicle, that is to ascertain whether it is rectangular or for some reason not rectangular or out of line, vertical-extending rods 300 and 302 are provided which are slidable upon the longitudinally-extending rods 304 and 306, which rods are rigidly secured to the transverse tracks 172 and 174. The longitudinal rods 304 and 306 are calibrated so that the position of the vertically-extending rods may be read directly. Carried on each of the forward platforms on the inside are a pair of longitudinally-extending rods 308 and 310 which are also calibrated and which carry vertically-extending rods 312 and 314.

When it is desired to make the test of a vehicle the same is driven on the runway and the four wheels are positioned on the platforms 30, 30', 32 and 32' and the front axle of the vehicle is held by the clamp 34. To test brakes the forward and rearward treads 112 and 166 are reciprocated horizontally against the resistance of the wheel brakes and the force required for such movement is measured directly on the dynamometers or gauges 40, 42, 44 and 46. If the vehicle is driven on the device askew, the vehicle may be straightened readily since the platforms upon which the rear wheels are carried are freely movable transversely of the runways and accordingly permit easy alignment of the car parallel to its runway. It has been found preferable to connect the two rear platforms for simultaneous movement by links such as 316 and 318. If it is desired to test the brakes of the front wheels while the same are steered to the right or to the left the front wheels of the vehicle resting on the turntables 120 permit the free rotation of the forward platforms 30 and 30' which are also preferably connected together for simultaneous movement by link 320. After the platforms are positioned to any desired angle, the steering wheels of the vehicle can then be turned so that the planes of the wheels are parallel with the platforms and thereafter the test of the front wheel brakes may be continued as before.

In order to test alignment of the front wheels of the vehicle, the vehicle is driven forward over the treads 112, which treads being pivoted at 114 are free to swing should the front wheels produce any side thrust thereon and the amount of swinging movement may be conveniently read on the scales 322 and 324 which are provided adjacent the end of the swingable tread 112. To measure the front wheel alignment while the wheels are turned to the right or left merely necessitates swinging the front wheel platforms to the right or left any desired amount corresponding to the angle to which the wheels are steered. It should be noted, however, that during usual brake testing with the vehicle fixed, the relative movement between the forward wheel platform and the vehicle wheels supported thereon will roughly indicate alignment or misalignment depending on whether the treads 112 swing during such brake test. If an indication of misalignment appears during brake testing then more accurate measurement as to the extent of such alignment can be determined by rolling the car over the full length of the tread.

The turntable 120 has additional utility since the adjacent tread is provided with graduations 326 and 328 to indicate the angle through which the turntable turns. Thus the turntables provide a support for the wheels permitting the wheels to be turned readily to any desired angle so that instruments for measuring king-pin inclination and caster, which are highly important measurements in the checking of the steering mechanism of the vehicle, may be applied.

While the vehicle is aligned on the runway parallel therewith, it is comparatively easy to check the frame to ascertain whether it has been sprung by merely sliding the vertical rods 312 and 314 and 300 and 302 into engagement with a transverse or cross member of the vehicle which may be either an axle or a cross brace. The measurements thus obtained are read directly on the longitudinal rods 304, 306, 308, 310 thereby indicating clearly the trueness of the vehicle frame.

It will appear that an apparatus which is simple and compact is thus provided which is adapted to check the condition of the chassis, the alignment of its wheels and the adjustment of its brakes, which apparatus requires no more space than substantially that required by the vehicle itself and which apparatus is simple to operate and produces direct readings.

Though but a single modification of the invention has been illustrated and described, it is to be understood that the invention is not limited thereto but may be embodied in various mechanical arrangements or forms. As many changes in construction and arrangement of parts may be made without departing from the spirit of the invention, as will be apparent to those skilled in the art, reference will be had to the appended claims for a definition of the limits of the invention.

What is claimed is:

1. A service apparatus for testing brakes of an automotive vehicle anchored against movement comprising means for supporting the rear wheels of said vehicle, means for supporting the forward dirigible wheels of the vehicle, and means on said supporting means for turning the vehicle wheels against resistance of their brakes and measuring the force applied thereto, said means for supporting the forward wheels being adapted to be turned in a horizontal plane to be aligned with the wheel in various steering positions, whereby testing of front wheel brakes may be accomplished while simulating turning of the vehicle.

2. A service apparatus for testing brakes of a vehicle anchored against movement comprising means for supporting a front dirigible wheel of a vehicle, and means carried by said supporting means for turning the wheel against the resistance of its brake and measuring the force applied thereto, said supporting means being adapted for angular displacement about a vertical axis to facilitate brake tests when the supported wheel is turned at an angle from the normal straight away position.

3. A service apparatus for testing brakes of a vehicle anchored against movement and wheel alignment comprising a supporting means for the front dirigible wheel of a vehicle pivotally arranged to swing about a vertical axis within the support area, means on said support for rotating said wheel against the resistance of its brake and measuring the force applied thereto, and a support plate rotatably mounted on said supporting means and normally concentric with the vertical axis of the supporting means, whereby the supporting means may be rotated independent of the support plate and vice versa.

4. A service apparatus for testing brakes and wheel alignment comprising a supporting means for the front dirigible wheel of a vehicle pivotally mounted to swing about a vertical axis, a longitudinally reciprocable carriage mounted on said support, and a laterally movable wheel tread mounted on said carriage.

5. A service apparatus for testing brakes and wheel alignment comprising a supporting means for the front dirigible wheel of a vehicle pivotally mounted to swing about a vertical axis, a longitudinally reciprocable carriage mounted on said support, a laterally movable wheel tread mounted on said carriage, and a supporting plate rotatably mounted at one end of the carriage and having an axis capable of alignment with the pivotal axis of the supporting means, through movement of said reciprocable carriage.

6. A service apparatus for testing brakes and wheel alignment comprising a supporting means for the front dirigible wheel of a vehicle pivotally mounted to swing about a vertical axis, a longitudinally reciprocable carriage mounted on said support, a wheel tread extending over and pivotally mounted on said carriage at one end thereof, and a rotatable supporting plate adjacent said end and rotatable about an axis capable of alignment with the pivotal axis of the supporting means through movement of said reciprocable carriage.

7. A service apparatus for testing brakes and wheel alignment comprising, a supporting means for the front dirigible wheel of a vehicle pivotally mounted to swing about a vertical axis, a longitudinally reciprocable carriage mounted on said support, a laterally movable wheel tread mounted on said carriage, and means for reciprocating said carriage and tread longitudinally against the resistance of vehicle wheel brake and measuring the force applied thereto.

8. A service apparatus for testing brakes and wheel alignment comprising a supporting means for the front dirigible wheel of a vehicle pivotally mounted to swing about a vertical axis, a longitudinally reciprocable carriage mounted on said support, a laterally movable wheel tread mounted on said carriage, a supporting plate rotatably mounted at one end of the carriage and having an axis capable of alignment with the pivotal axis of the supporting means through movement of said reciprocable carriage, and means for reciprocating said carriage and tread longitudinally against the resistance of vehicle wheel brake and measuring the force applied thereto.

9. A service apparatus for testing brakes and wheel alignment comprising, a supporting means for the front dirigible wheel of a vehicle, pivotally mounted to swing about a vertical axis, a longitudinally reciprocable carriage mounted on said support, a wheel tread extending over and pivotally mounted on said carriage at one end thereof, and means for reciprocating said carriage and tread longitudinally against the resistance of vehicle wheel brake and measuring the force applied thereto.

10. A service apparatus for testing brakes of dirigible wheels of a vehicle, comprising a pair of horizontally swingable supports swingable about fixed spaced axes and means for testing brake efficiency carried on the supports and swingable therewith.

11. A service apparatus for testing wheel alignment and brakes of dirigible wheels of a vehicle, comprising a horizontally swingable support and means carried on the support and swingable therewith for testing brake efficiency, said means comprising a tread pivotally supported at one end on a reciprocable carriage.

12. A service apparatus for testing wheel alignment and brakes of dirigible wheels of a vehicle, comprising a horizontally swingable support, means carried on the support and swingable therewith for testing brake efficiency, said means comprising a tread pivotally supported at one end on a reciprocable carriage, and a rotatable support plate on the carriage adjacent one end of said tread.

13. A service apparatus for testing brakes comprising a frame, a reciprocable carriage therein, a substantially horizontal wheel tread thereon, a power cylinder secured to the carriage, a piston adapted to reciprocate therein, a piston rod, and means connecting said rod to said frame, said means including a dynamometer to indicate the force exerted in the connecting means.

14. A service apparatus for testing brakes comprising a frame, a reciprocable carriage, an expansible chamber motor connected between said carriage and frame for reciprocating the carriage, and means associated with the connection to the frame and including a dynamometer for measuring the force applied to reciprocate the carriage.

15. A service apparatus for testing brakes comprising a frame, a reciprocable carriage, an expansible chamber motor connected between said carriage and frame for reciprocating the carriage, and means associated with the connection to the frame and including a dynamometer for measuring the force applied to reciprocate the carriage, said means comprising a connection to a short vertically-extending arm of a bell crank transversely pivoted on said frame and having an arm extending longitudinally with respect to said frame, and a transverse lever connected to said longitudinally-extending arm and connected to an indicating instrument.

16. A service apparatus for testing the four brakes of the four wheels of a vehicle comprising a reciprocable carriage for rotating each wheel, fluid pressure means for reciprocating each carriage, a source of fluid pressure, a valve for controlling the flow of fluid simultaneously to all of the fluid pressure means, and separate valves for individually controlling the flow of fluid to each of the fluid pressure means when reciprocating the carriages in one direction only.

17. A service apparatus for testing the four brakes of the four wheels of a vehicle, comprising reciprocable carriages each having a wheel tread for each of the wheels of the vehicle, and means laterally movable for supporting two of said carriages.

18. A service apparatus for testing the four brakes of the four wheels of a vehicle, comprising a reciprocable carriage having a wheel tread for each of the wheels of the vehicle, means laterally movable for supporting two of said carriages, and means on the laterally movable carriages and associated with the other carriages for measuring the alignment of the vehicle frame.

19. A service apparatus for testing wheel alignment and brakes of dirigible wheels of a vehicle, comprising a horizontally swingable support, and means for testing brake efficiency carried on the support and swingable therewith, said means including wheel tread means laterally movable with respect to the support for measuring wheel alignment and relieving the wheels of side thrust during brake testing.

20. A service apparatus for testing wheel alignment and brakes of dirigible wheels of a vehicle, comprising a horizontally transversely-movable support, and means for testing brake efficiency carried on the support and movable therewith, said means including wheel tread means laterally movable with respect to the support for measuring wheel alignment and relieving the wheels of side thrust during brake testing.

21. A service apparatus for testing brakes and wheel alignment comprising a supporting means, a laterally and longitudinally-movable wheel tread carried thereon, means for moving said tread longitudinally independent of any vehicle resting thereon, and means for indicating resistance to wheel rotation upon longitudinal movement of the wheel tread and simultaneously wheel alignment by lateral movement of the wheel tread.

22. A service apparatus for testing brakes and wheel alignment comprising a supporting means, a wheel tread carried thereon movable laterally and longitudinally with respect to the supporting means, and means on said supporting means for moving said tread longitudinally independent of any vehicle resting thereon.

LEE L. SMALLEY.